Patented July 4, 1933

1,916,603

UNITED STATES PATENT OFFICE

MAX BUCHNER, OF HANOVER-KLEEFELD, AND FRITZ GEWECKE, OF WUNSTORF NEAR HANOVER, GERMANY

PROCESS OF PRODUCING ALUMINIUM SULPHATE

No Drawing. Application filed November 18, 1929, Serial No. 408,157, and in Germany November 24, 1928.

Up to the present time aluminium sulphate has been produced by an acid decomposition of aluminous materials or by dissolving aluminium-hydrate prepared by the alkaline process with sulphuric acid. Only in the latter way it is possible to get a pure aluminium-sulphate free from iron in a simple manner. Using the acid decomposition it is necessary to make the aluminium-sulphate-solution very dilute, for example, by adding large quantities of water, so as to precipitate the iron, for example, with potassium-ferrocyanide.

According to the present invention aluminium-sulphate is produced from aluminium-nitrate. It has been found, that by heating aluminium nitrate with sulphuric acid aluminium sulphate can be obtained. This reaction is already possible by using equivalent quantities of sulphuric acid. By this process a quantity of nitric acid is recuperated which is equivalent to the sulphuric acid used.

The process is very simple if carried through in vacuo. A part of the nitric acid begins to distill at 105° C.; then a further part at higher temperatures. The last amount of the nitric acid can be separated at temperatures up to 300° C. By working at this temperature an aluminium sulphate is obtained, which is nearly free from water.

It is surprising, that by using concentrated sulphuric acid, for example such of 98% or concentrated acid of the trade the nitric acid can be separated while working at the above mentioned temperature of 300° C. and that nitrous gases are not produced. By working in this manner the heat being liberated during the reaction between aluminium nitrate and sulphuric acid may be used for driving off or distilling the nitric acid so that the quantity of heat necessary for the distillation accordingly can be reduced. It is advisable to move the reaction-mixture while the reaction takes place. It is also possible, to carry through the reaction by using solid aluminium nitrate.

A surprising fact is, that the process can be carried through in apparatus or vessels being constructed from chromium-iron or chromium-iron-nickel alloys. The nickel-chrome-iron alloy $V_2A$ will not be destroyed or attacked, although this alloy is not resistant against sulphuric acid.

It is especially advantageous to use for carrying through the process, aluminium nitrate being obtained by treating aluminous raw materials for example clay with nitric acid in deficiency relating to the alumina-content of the raw material. Eventually the aluminous raw material mixed with nitric acid may be stored for some time, several days, at lower temperatures, and advantageously while stirring the mass.

The aluminous raw material is treated with nitric acid while heating, for example up to 80–100° C., eventually by using pressure above atmospheric pressure, for example 6–8 atmospheres and corresponding temperatures of 150–160° C. It is advisable to carry through the treatment with the nitric acid at higher temperatures and pressures, thus that first the mass is heated to 80–100° C. and then the temperature and pressure raised in stages up to the above mentioned degree.

By this treatment of the aluminous raw material with nitric acid which will be advantageously carried through in apparatus constructed of chromium-iron or chromium-iron-nickel alloys, for example, nickel-chrome-steel known as $V_2A$-steel a basic aluminium nitrate-solution is obtained which contains a very little content of impurities.

The practical total separation of iron can be effected by treating the aluminium nitrate solution with concentrated or gaseous nitric acid, where-at aluminium nitrate is precipitated or by bringing the solution by heating up to temperatures of 130° C. to a fixed degree of basicity so that the basic aluminium nitrate remains dissolved but would be precipitated by further increase of basicity.

The degree of basicity also can be obtained by adding alkali metal hydrates or carbonates or substances having an alkaline reaction, such as by adding alumina, aluminium hydrate, hydrates or carbonates of the alkaline earth metals or alkaline metals. By this treatment the iron is converted into colloidal form and by evaporating or cooling to lower temperatures, say to 0° C. an aluminium nitrate is precipitated which is practically free from iron.

The aluminium nitrate can be subjected to the decomposition with sulphuric acid as it is obtained by the preliminary treatment, eventually also in a solid state so as to produce the desired aluminium sulphate.

In this manner it is possible to produce a pure aluminium sulphate, practically free from iron, even from aluminous raw materials having a large content of iron such as red bauxite, which up to the present could not be used.

By subjecting the basic nitrates obtained by the above described process immediately to the treatment with sulphuric acid and using the quantity of sulphuric acid equivalent to the nitric acid contained in the nitrate, the corresponding sulphates are obtained.

The nitric acid obtained by the treatment of aluminium nitrate with sulphuric acid can be used for the decomposition of new quantities of raw material and so for the production of new quantities of aluminium nitrate.

We claim:

1. A process for producing aluminium sulphate, comprising reacting sulphuric acid with aluminium nitrate while heating the mixture in an apparatus of chromium-iron alloy.

2. A process for producing aluminium sulphate, comprising reacting sulphuric acid with aluminium nitrate while heating the mixture in an apparatus of chromium-iron-nickel alloy.

3. A process for producing aluminium sulphate, comprising distilling nitric acid while reacting aluminium nitrate with sulphuric acid and heating in an apparatus constructed of chromium-iron-nickel alloy.

In testimony that we claim the foregoing as our invention, we have signed our names.

MAX BUCHNER.
FRITZ GEWECKE.